(12) United States Patent
Asuma et al.

(10) Patent No.: US 7,110,068 B2
(45) Date of Patent: Sep. 19, 2006

(54) LIQUID CRYSTAL DISPLAY DEVICE

(75) Inventors: Hiroaki Asuma, Mobara (JP); Atsushi Hasegawa, Tohgane (JP); Toshio Miyazawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 10/625,722

(22) Filed: Jul. 24, 2003

(65) Prior Publication Data

US 2005/0190315 A1 Sep. 1, 2005

(30) Foreign Application Priority Data

Jul. 30, 2002 (JP) ............................. 2002-220605

(51) Int. Cl.
*G02F 1/1333* (2006.01)
*G02F 1/1343* (2006.01)

(52) U.S. Cl. ........................... 349/110; 349/139
(58) Field of Classification Search ................. 349/44, 349/54–55, 110, 122, 42–43, 139
See application file for complete search history.

(56) References Cited

U.S. PATENT DOCUMENTS

| | | | | |
|---|---|---|---|---|
| 5,062,690 | A | 11/1991 | Whetten | 349/55 |
| 5,233,211 | A * | 8/1993 | Hayashi et al. | 257/347 |
| 5,847,781 | A | 12/1998 | Ono | 349/44 |
| 6,429,907 | B1 | 8/2002 | Park | 349/38 |
| 6,429,909 | B1 | 8/2002 | Kim et al. | |
| 6,476,882 | B1 | 11/2002 | Sakurai | 349/55 |
| 6,710,827 | B1 * | 3/2004 | Kubo et al. | 349/55 |
| 6,825,891 | B1 * | 11/2004 | Kurashina | 349/38 |
| 2002/0050967 | A1 | 5/2002 | Hashimoto et al. | 345/87 |
| 2002/0057391 | A1 | 5/2002 | Nakamura | 349/39 |

FOREIGN PATENT DOCUMENTS

| | | |
|---|---|---|
| JP | 4318522 | 10/1992 |
| JP | 5142570 | 6/1993 |
| JP | 08-160460 A | 6/1996 |
| JP | 933951 | 2/1997 |
| JP | 9-236812 | 9/1997 |
| JP | 09-297302 A | 11/1997 |
| JP | 10-26771 A | 1/1998 |
| JP | 10-239678 | 9/1998 |
| JP | 2000-122092 | 4/2000 |
| JP | 2001-209041 A | 8/2001 |
| JP | 2002-151699 A | 5/2002 |
| JP | 2002162644 | 6/2002 |

\* cited by examiner

*Primary Examiner*—Dung T. Nguyen
(74) *Attorney, Agent, or Firm*—Antonelli, Terry, Stout and Kraus, LLP.

(57) ABSTRACT

A display device, which exhibits improved image qualities has a pair of substrates which sandwich a liquid crystal layer therebetween. On one of the substrates there are a plurality of video signal lines, a plurality of pixel electrodes, which are arranged in a matrix array and to which video signals are supplied from the video signal lines, and a plurality of conductive layers, which are provided at positions where portions thereof overlap with the video signal lines by way of an insulation film. The respective conductive layers are electrically connected to respective video signal lines. Further, the conductive layer is able to prevent light irradiated from a backlight from leaking through a gap defined between two neighboring pixel electrodes.

15 Claims, 11 Drawing Sheets

LIQUID CRYSTAL DISPLAY DEVICE

BACKGROUND OF THE INVENTION

The present invention relates to a display device, and more particularly, to improvements in a liquid crystal display device which result in improved image quality.

An active matrix type liquid crystal display device is, for example, configured such that, on one substrate of a pair of substrates having a liquid crystal layer sandwiched therebetween, there are a plurality of scanning signal lines, a plurality of video signal lines which cross the plurality of scanning signal lines, and a plurality of pixels arranged in a matrix array. Each one of the plurality of pixels includes a switching element which is driven by a scanning signal line and a pixel electrode, to which video signals are supplied from a video signal line through the switching element. A counter electrode is formed on another substrate of the pair of substrates. The state of the light which passes through the liquid crystal layer is controlled by driving the liquid crystal using electric fields generated between the counter electrode and the pixel electrodes, thus producing a display of images.

Since the typical liquid crystal display device is not a self-luminous type display device, an auxiliary light source unit is provided for supplying light from the outside of the liquid crystal display panel. As one example, there is a known a liquid crystal display device in which a backlight is arranged on a side opposite to a display screen side (observer side) of the liquid crystal display pane, so that the liquid crystal display panel is illuminated from the back surface thereof. However, when light irradiated from the backlight leaks from a portion of a gap defined between neighboring pixel electrodes and an observer observes the leaked light, the contrast is lowered and the image quality is degraded.

Further, a parasitic capacitance is generated between the video signal line and the pixel electrode. When this parasitic capacitance is large, a phenomenon which is referred to as a vertical smear (also referred to as "vertical crosstalk") becomes apparent and affects the image quality. This vertical smear is a phenomenon in which, when a display is performed as a white display window or a black display window, while adopting a half tone display as a background, the level of the half tone display at portions of the background at upper and lower sides (vertical direction) of the window is shifted either in the white display direction or in the black display direction, and these portions become different from portions of the background which have no window in color.

As ways to solve such a drawback, a technique is disclosed in Japanese Unexamined Patent Publication 209041/2001 (hereinafter referred to as "publication 1") and a technique is disclosed in Japanese Unexamined Patent Publication 151699/2002 (hereinafter referred to as "publication 2").

Figure 15:
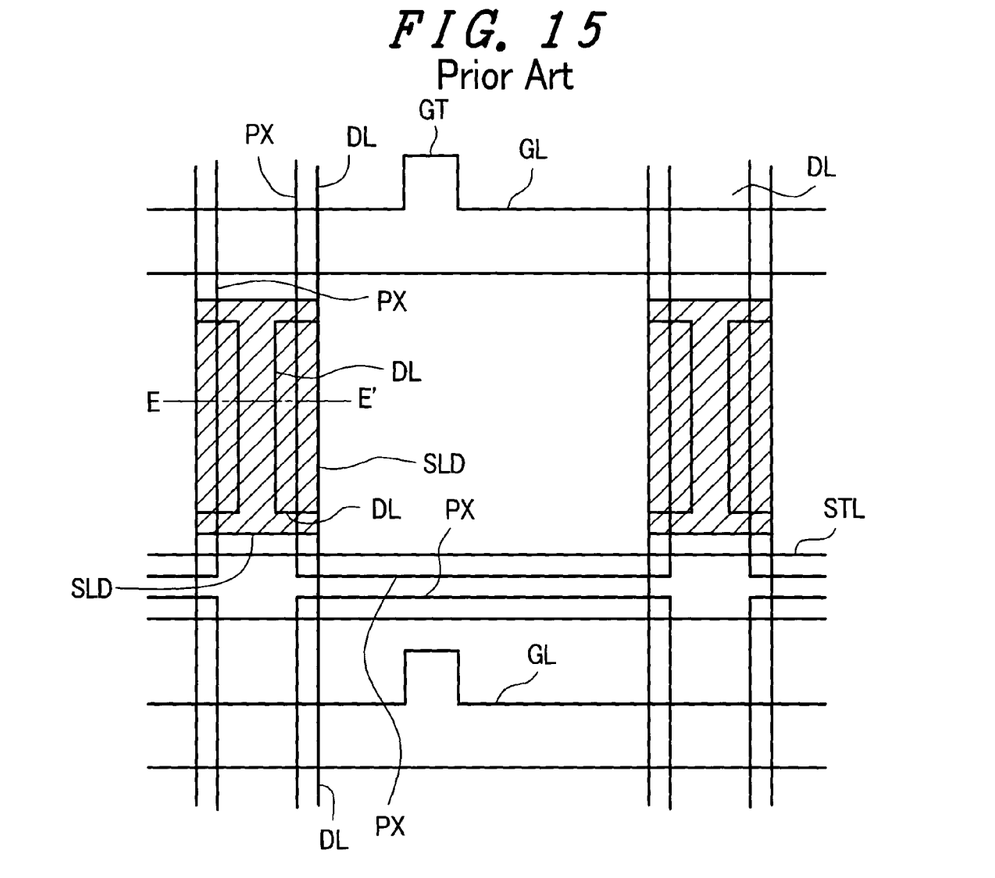
FIG. 15 is a diagrammatic plan view of a pixel portion of a previously proposed display device.
Figure 16:
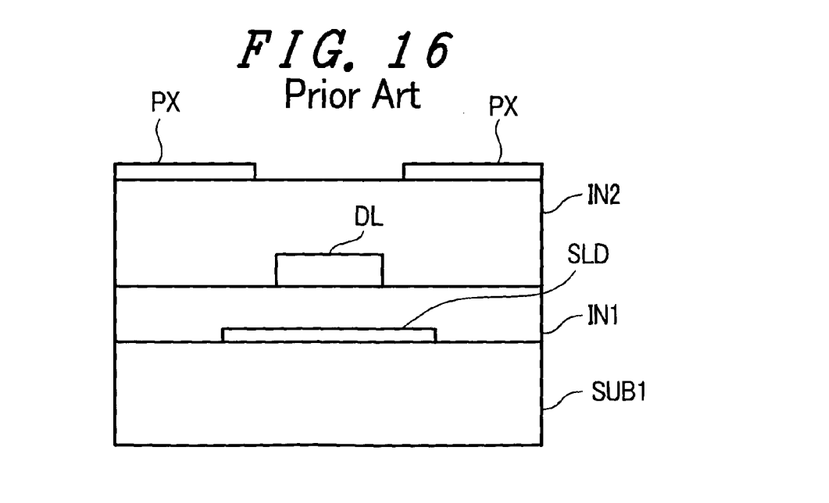
FIG. 16 is a cross-sectional view taken along a line E-E' in FIG. 15.

FIG. 15 is a diagram of a pixel portion schematically showing the constitution of the technique described in publication 1. Further, FIG. 16 is a cross-sectional view taken along a line E-E' in FIG. 15. Here, in FIG. 15 and FIG. 16, to facilitate an understanding of the constitution of the technique disclosed in publication 1, the structure is simplified by omitting or modifying some constituent elements.

In FIG. 15, a video signal line (data line) DL has a portion thereof which overlaps with the pixel electrode PX. However, the video signal line DL has a narrow width portion, where the width is narrowed at a portion cut by the E-E' line and the video signal line DL does not overlap with the pixel electrode PX, as shown in FIG. 16. Accordingly, it is possible to reduce the parasitic capacitance which is generated between the video signal line DL and the pixel electrode PX, which are separated by a second insulation film IN2.

However, with the provision of such a structural arrangement between the signal line DL and the pixel electrode PX, light tends to leak through a gap defined between the pixel electrode PX and the video signal line DL; and, hence, a light shielding film SLD is formed below the narrow width portion of the video signal line DL, with the film SLD being separated therefrom by way of a first insulation film IN1. By overlapping the light shielding film SLD relative to the edge portions of adjacent pixel electrodes PX, it is possible to block light which is irradiated from a backlight and is incident from a back surface of the substrate SUB1.

Here, in the technique disclosed in publication 1, the light shielding film SLD is formed of the same material as that used for forming a storage line (capacitance line) STL, which generates a storage capacitance, and the light shielding film SLD and the storage line STL are electrically insulated from each other. Further, GT indicates gate electrodes and GL indicates scanning signal lines (scanning lines).

Figure 17:
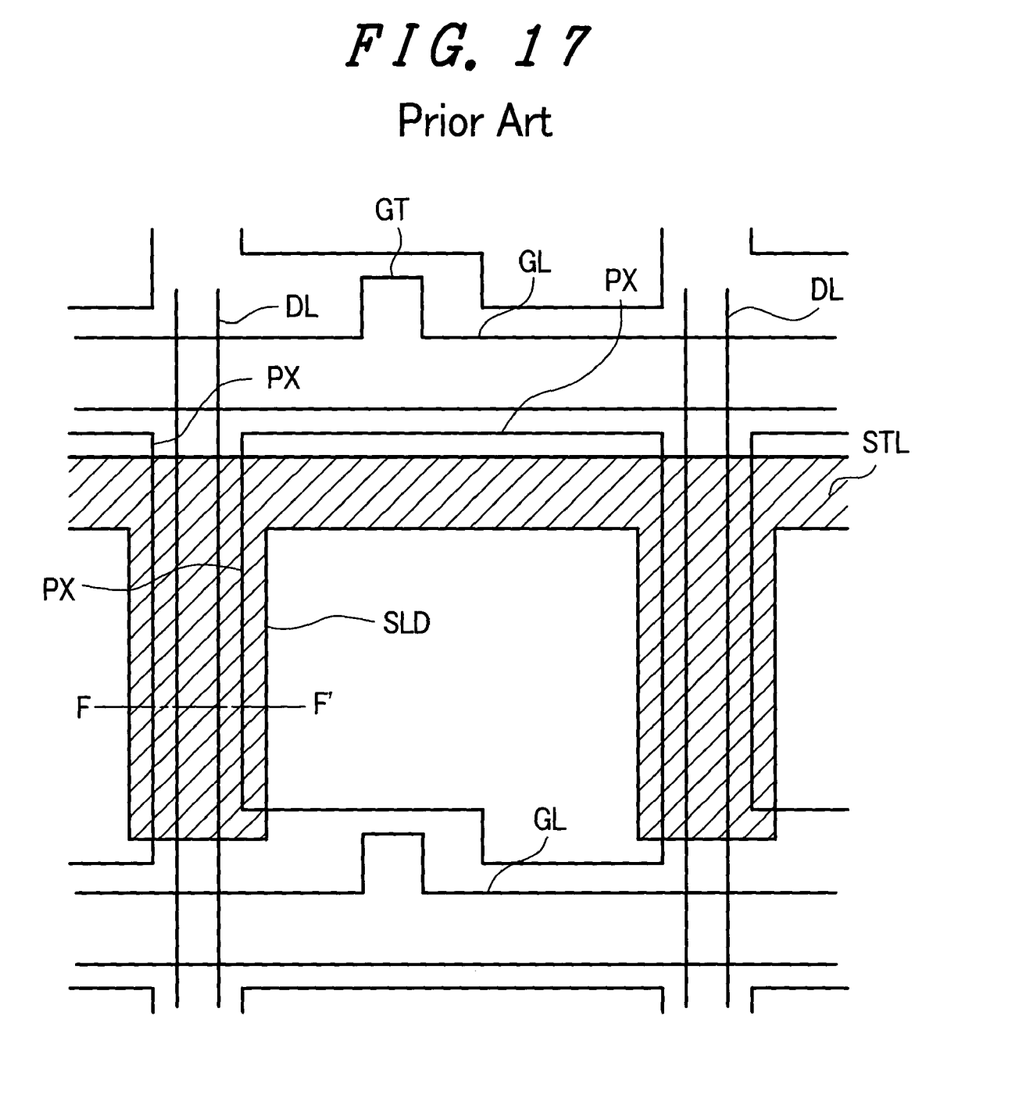
FIG. 17 is a diagrammatic plan view of a pixel portion of a previously proposed display device.

FIG. 17 is a plan view of a pixel portion showing the constitution of the technique disclosed in publication 2. Also, in FIG. 17, to facilitate an understanding of the constitution, the structure is simplified by omitting or modifying some constituent elements. Here, constitutional elements corresponding to the constitutional elements shown in FIG. 15 are given the same numerals, and a repeated explanation thereof will be omitted.

To compare the constitution shown in FIG. 17 with the constitution shown in FIG. 15, the technique of publication 2 differs from that disclosed in publication 1 with respect to the fact that the width of the video signal line DL is fixed and with respect to the shape of the pixel electrode PX, but they are substantially equal in other respects. Since the cross-sectional view taken along a line F-F' in FIG. 17 is the same as that of FIG. 16, an explanation thereof will be omitted.

The essential difference lies in the fact that the light shielding film SLD, which overlaps the video signal line DL, is integrally formed with the storage line STL. Accordingly, although the light shielding film SLD is in a floating state in the display device disclosed in publication 1, the light shielding film SLD has the same potential as the storage line STL in the constitution disclosed in publication 2.

However, the techniques disclosed in publication 1 and publication 2 have the following drawbacks.

In the technique of publication 1, since the light shielding film SLD is electrically floating, the display device suffers from another degradation of images that is different from vertical smear. In the display device of publication 1, since the light shielding film SLD is floating, with a change of the potential of the video signal line DL, the potential of the light shielding film SLD also will be changed. Here, however, there exists a case in which, due to the influence of static electricity or the like, out of a plurality of light shielding films SLD, the potential of only some light shielding films SLD will suddenly change without regard to the change of potential of the video signal line DL. In this case, the potential of some corresponding pixel electrodes PX will be subject to the influence of this change. As a result, this may give rise to a display having some gray scales that are remarkably different from other gray scales around the display, thus degrading the image quality of the display.

In the technique of publication 2, since the light shielding film SLD is held at the same potential as the storage line STL, the phenomenon which occurs in the display device disclosed in the publication 1 does not occur. However, the light shielding film SLD, which overlaps the video signal line DL by way of the first insulation film IN1, is held at a fixed potential that is different from the potential of the video signal line DL. As a result, the load is increased at the time of driving the display device by supplying video signals to the video signal line, the power consumption is increased, and, at the same time, the image quality is degraded due to rounding of the waveforms.

SUMMARY OF THE INVENTION

Accordingly, it is an object of the present invention to provide a display device having an improved image quality.

To achieve this object, according to the present invention, when conductive layers are formed along video signal lines at positions where the conductive layers are overlapped relative to portions of the video signal lines, the conductive layers and the video signal lines are electrically connected with each other.

An example of the constitutional features of the present invention will be described hereinafter.

(1) In a liquid crystal display device which comprises a plurality of video signal lines and a plurality of pixel electrodes which are arranged in a matrix array and to which video signals are supplied from the video signal lines on one of a pair of substrates having a liquid crystal layer sandwiched therebetween, one substrate includes a plurality of conductive layers which are provided at positions where portions thereof are overlapped relative to the video signal lines by way of an insulation film, and the respective conductive layers are electrically connected to the video signal lines.

(2) In the constitution (1), a backlight is provided at a side of one substrate opposite to the liquid crystal layer, and the conductive layer prevents light from the backlight from leaking through a gap defined between two neighboring pixel electrodes.

(3) In the constitution (1) or (2), each conductive layer is electrically connected to the video signal line at one point by way of a contact hole formed in the insulation film.

(4) In the constitution (1) or (2), each conductive layer is electrically connected to the video signal line at two or more points by way of contact holes formed in the insulation film.

(5) In a liquid crystal display device which comprises a plurality of scanning signal lines, a plurality of video signal lines which cross the plurality of scanning signal lines, and a plurality of pixels which are arranged in a matrix array on one of a pair of substrates having a liquid crystal layer sandwiched therebetween, each pixel in the plurality of pixels includes a switching element driven by the scanning signal line and a pixel electrode to which video signals are supplied from the video signal line through the switching element; the one substrate includes opaque conductive layers at positions where portions thereof are overlapped relative to the video signal lines by way of an insulation film, such that the opaque conductive layers are arranged closer to the one substrate side than the video signal lines; and each opaque conductive layer has a portion which has a width greater than the width of the video signal line, each opaque conductive layer is partially overlapped relative to both of the pixel electrodes of two neighboring pixels having the video signal line arranged therebetween, and each opaque conductive layer is electrically connected to the video signal line.

(6) In the constitution (5), each opaque conductive layer is electrically connected to the video signal line at one point by way of a contact hole formed in the insulation film.

(7) In the constitution (5), each opaque conductive layer is electrically connected to the video signal line at two or more points by way of contact holes formed in the insulation film.

(8) In any one of the constitutions (5) to (7), the video signal line and the opaque conductive layer are electrically connected to each other via a contact hole formed in the insulation film, and the video signal line has a larger width at a portion thereof corresponding to the contact hole than the width at other portions thereof.

(9) In any one of the constitutions (5) to (8), the video signal line has at least a portion which has a width equal to or smaller than a gap between pixel electrodes of two neighboring pixels which a video signal line arranged therebetween.

(10) In any one of the constitutions (5) to (9), an area of a portion where the opaque conductive layer and the pixel electrode are overlapped relative to each other is larger than the area of a portion where the video signal line and the pixel electrode overlap.

(11) In any one of the constitutions (5) to (10), the opaque conductive layer is formed of the same material as the scanning signal line.

(12) In any one of the constitutions (5) to (11), the liquid crystal display device includes a plurality of capacitance lines for forming storage capacitances in the respective pixels, and the opaque conductive layers are formed of the same material as the capacitance lines.

(13) In any one of the constitutions (5) to (12), the opaque conductive layers are formed in independent patterns corresponding to a gap between two neighboring pixels.

(14) In any one of the constitutions (5) to (13), the pixel electrode is a transparent electrode.

(15) In any one of the constitutions (5) to (13), the pixel electrode is a reflective electrode.

(16) In any one of the constitutions (5) to (13), the pixel electrode is a reflective electrode and each pixel includes a second pixel electrode which is formed of a transparent electrode and to which the video signals are applied.

(17) In the constitution (16), the opaque conductive layer is formed at a position where the opaque conductive layer does not overlap with the second pixel electrode.

(18) In either one of the constitutions (16) and (17), a step portion is formed between the transparent electrode in a light transmitting region and the reflective electrode in a light reflective region, and the thickness of the liquid crystal layer in the light transmitting region is greater than the thickness of the liquid crystal layer in the light reflective region.

(19) In any one of the constitutions (5) and (18), the distance from the opaque conductive layer to the pixel electrode as measured in the vertical direction with respect to the substrate is set to be greater than the distance from the video signal line to the pixel electrode as measured in the vertical direction with respect to the substrate.

(20) In any one of the constitutions (5) and (19), the liquid crystal display device includes a backlight.

The present invention is not limited to the above-mentioned constitutions, and so they can be properly modified without departing from the technical concept of the present invention.

DESCRIPTION OF THE PREFERRED EMBODIMENTS

Preferred embodiments of the present invention will be explained in detail in conjunction with the drawings.

First Embodiment

Figure 1:
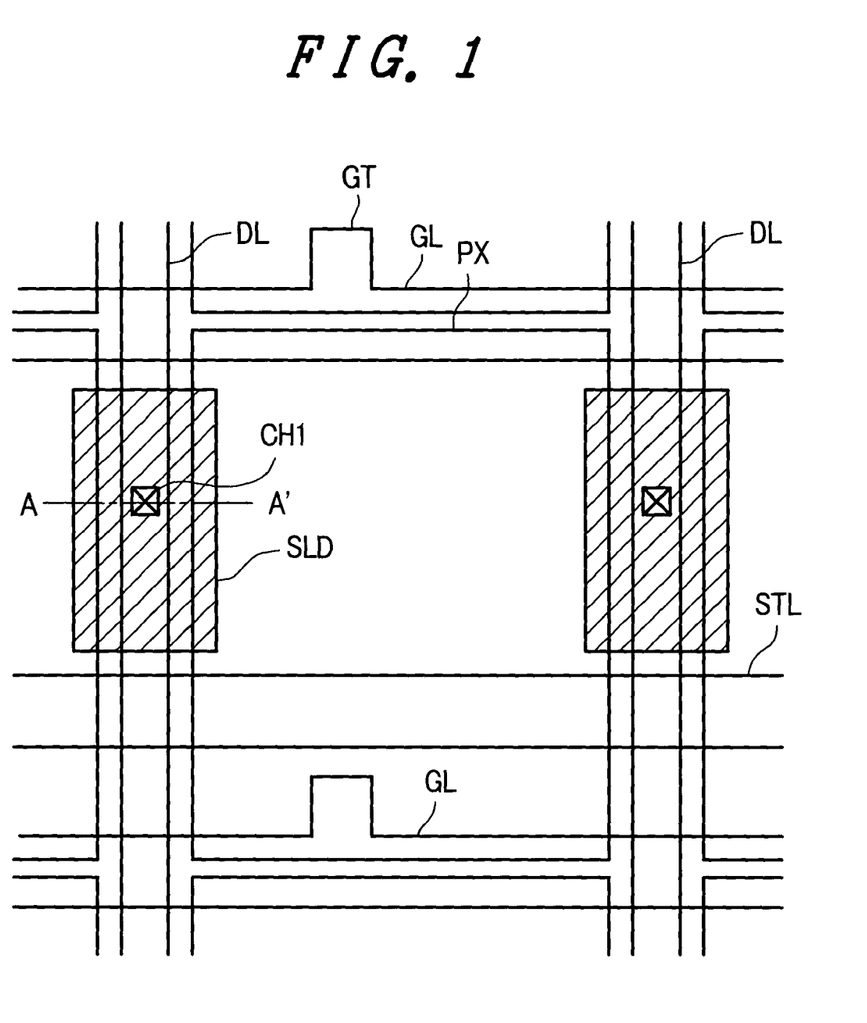
FIG. 1 is a diagrammatic plan view showing one example of the constitution of a pixel according to a first embodiment of the liquid crystal display device of the present invention.
Figure 2:
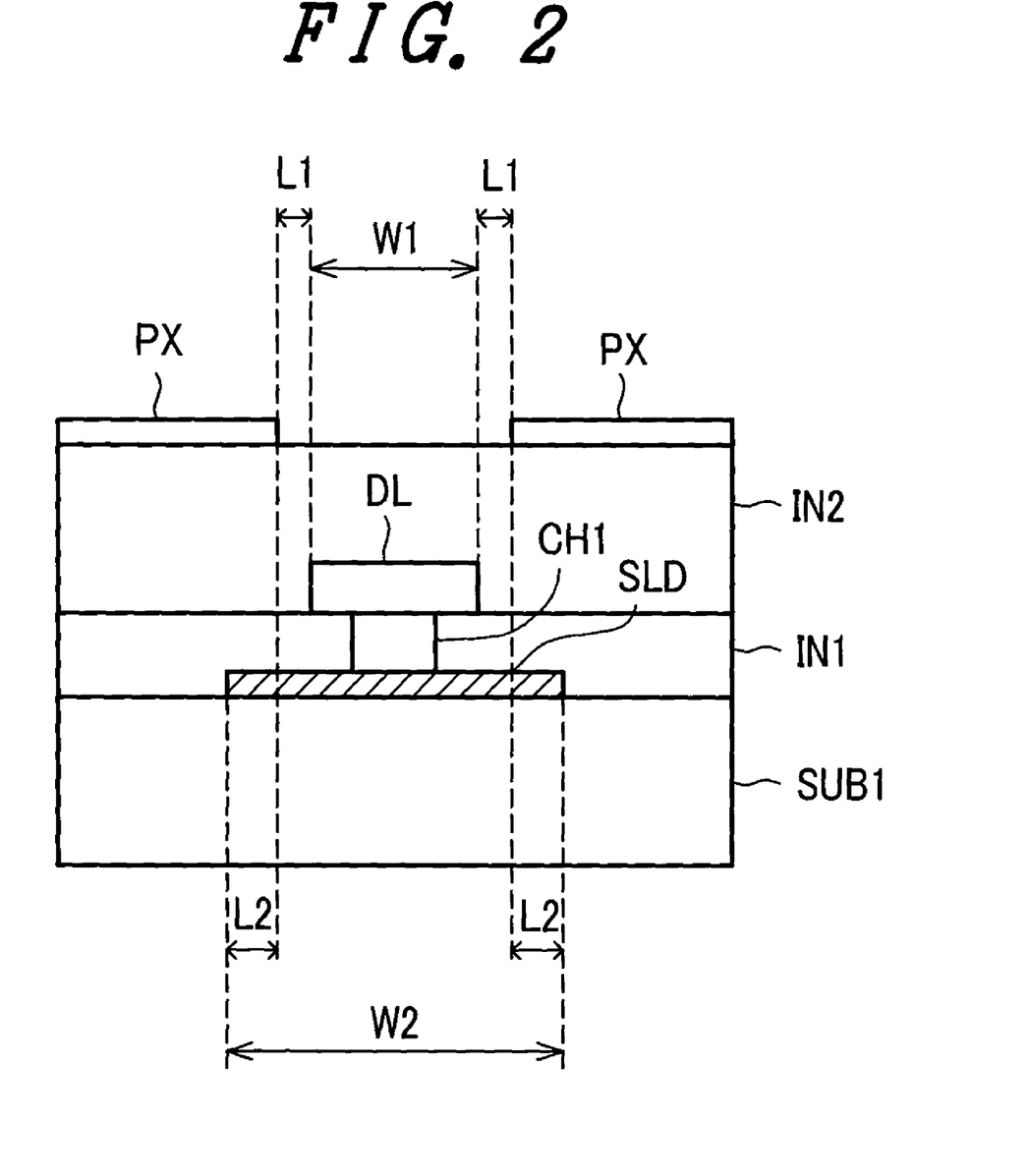
FIG. 2 is a cross-sectional view taken along a line A-A' in FIG. 1.

FIG. 1 is a diagram showing one example of the constitution of a pixel according to a first embodiment of a liquid crystal display device of the present invention. FIG. 2 is a cross-sectional view taken along a line A-A' in FIG. 1.

As shown in FIG. 1 and FIG. 2, the liquid crystal display device of this embodiment includes a plurality of video signal lines DL and a plurality of pixel electrodes PX, which are arranged in a matrix array and to which video signals are supplied from the video signal lines DL on one substrate SUB1 of a pair of substrates, which sandwich therebetween a liquid crystal layer LC (not shown in the drawing). The substrate SUB1 is preferably made of an insulating transparent material. In this regard, the substrate SUB1 may be formed of a glass substrate or a plastic substrate. The counter substrate SUB2 (not shown in the drawing), which constitutes the other substrate of the pair of substrates, is formed in the same manner. Further, the pixel electrode PX is formed of a transparent electrode made of ITO (Indium Tin Oxide) or the like, for example.

A plurality of conductive layers are formed at positions where the conductive layers have portions thereof which overlap with the video signal lines DL and are separated therefrom by way of an insulation film IN1. These conductive layers are formed of an opaque material, and they are capable of functioning as light shielding films. In the drawing, the conductive layers are indicated by symbol SLD, and, hereinafter, these conductive layers will be referred to as light shielding films SLD.

Here, as seen in FIG. 2, the light shielding films SLD are respectively electrically connected to respective video signal lines DL. In this manner, when a plurality of conductive layers (light shielding films SLD) are formed at positions where the conductive layers have portions thereof which overlap with the video signal lines DL and are separated therefrom by way of the insulation film IN1 and extend along the video signal lines DL, by electrically connecting the conductive layers (light shielding films SLD) with the video signal lines DL, it is possible to prevent the conductive layers from assuming a floating state. Further, since the potential of the conductive layer is not different from the potential of the video signal lines DL, it is possible to reduce or avoid any increase of the load or rounding of waveforms, which have occurred conventionally at the time of driving the video signal lines DL, as in the case of the display device described in the aforementioned publication 2. Due to such a constitution, it is possible to provide a display having a favorable image quality.

In this embodiment, as a method of electrically connecting the conductive layers SLD and the video signal lines DL, an example which establishes the electric connection using contact holes CH1 formed in the insulation film IN1 may be employed. In this embodiment, each light shielding film SLD is connected to a video signal line DL at one position. Here, when the light shielding films SLD can be formed using the same material as the scanning signal lines GL, both of them can be formed simultaneously, and, hence, any increase of the number of processing step in the manufacture can be prevented. Gate electrodes GT can be formed simultaneously with the scanning signal lines GL.

In this embodiment, each pixel includes a plurality of storage lines STL for forming storage capacitances Cstg (not shown in the drawing). By forming the light shielding films SLD using the same material as the storage lines STL, they can be formed simultaneously and hence, an increase of the number of processing steps in the manufacture of the display device can be prevented. In place of forming the storage capacitances Cstg using the storage lines STL, it is also possible to form additional capacitances Cadd by making use of the scanning signal lines GL of a preceding stage, and, hence, the storage lines STL are not indispensable in this embodiment.

Three components, consisting of the light shielding films SLD, the scanning signal lines GL and the storage lines STL, can be formed simultaneously using the same material. When the light shielding films SLD are formed simultaneously with the scanning signal lines GL and the storage lines STL, the light shielding films SLD cannot pass over these lines. Accordingly, a plurality of light shielding films are formed in patterns independent from each other corresponding to each gap defined between two neighboring pixels.

In a plurality of pixels which are arranged in a matrix array, each pixel includes a switching element (not shown in the drawing) which is driven by a scanning signal line GL and a pixel electrode PX, to which the video signals are supplied from the video signal lines DL through the switching element. As the switching elements, for example, thin film transistors (TFT) or the like can be used.

Here, it is preferable that the video signal line DL has the width W1 of at least a portion thereof set to a value equal to or smaller than the gap defined between the pixel electrodes PX of two neighboring pixels, which are arranged close to each other, with the video signal line DL being equally spaced therebetween. Due to such a constitution, the video signal line DL does not overlap with the pixel electrodes PX, as indicated by the spaces L1 in FIG. 2, and, hence, the parasitic capacitances, which are generated by the video signal line DL, the pixel electrodes PX and a second insulation film IN2 disposed between the video signal line DL and the pixel electrodes PX, can be reduced, whereby vertical smear can be reduced, as will be explained later.

However, with the provision of only such a constitution, light irradiated from a backlight BL (not shown in the drawing) still can leak through portions L1. Accordingly, the width W2 of the light shielding film SLD is set to a value greater than the width W1 of the video signal line DL, such that the portions of the light shielding film SLD overlap both edges of the pixel electrodes PX of two neighboring pixels, which are arranged close to each other, while sandwiching the video signal lines DL therebetween, as indicated by the spaces L2 in FIG. 2. Due to such a constitution, the light shielding film SLD can prevent light irradiated from the backlight BL from leaking through the gap defined between two neighboring pixel electrodes PX.

Here, since the light shielding film SLD is electrically connected to the video signal line DL, a parasitic capacitance is generated between the light shielding film SLD and the pixel electrode PX. However, since the light shielding film SLD is formed at the substrate SUB1 side below the video signal line DL and is spaced therefrom by the insulation film IN1, the total film thickness of the insulation films, with respect to the light shielding film SLD, is made larger than the total film thickness of the insulation films with respect to the video signal line DL. That is, the distance from the light shielding film SLD to the pixel electrode PX, as measured in the vertical direction with respect to the substrate SUB1, in the regions where the light shielding film SLD overlaps with the pixel electrodes PX, is set to be greater than the distance from the video signal line DL to the pixel electrode PX, as measured in the vertical direction with respect to the substrate SUB1. In this manner, since the distance from the light shielding film SLD to the pixel electrodes PX is more remote than the distance from the video signal line DL to the pixel electrodes PX, the generation of a parasitic capacitance can be suppressed.

As described above, according to the present invention, it is possible to provide a display device having improved image qualities.

Second Embodiment

Figure 3:
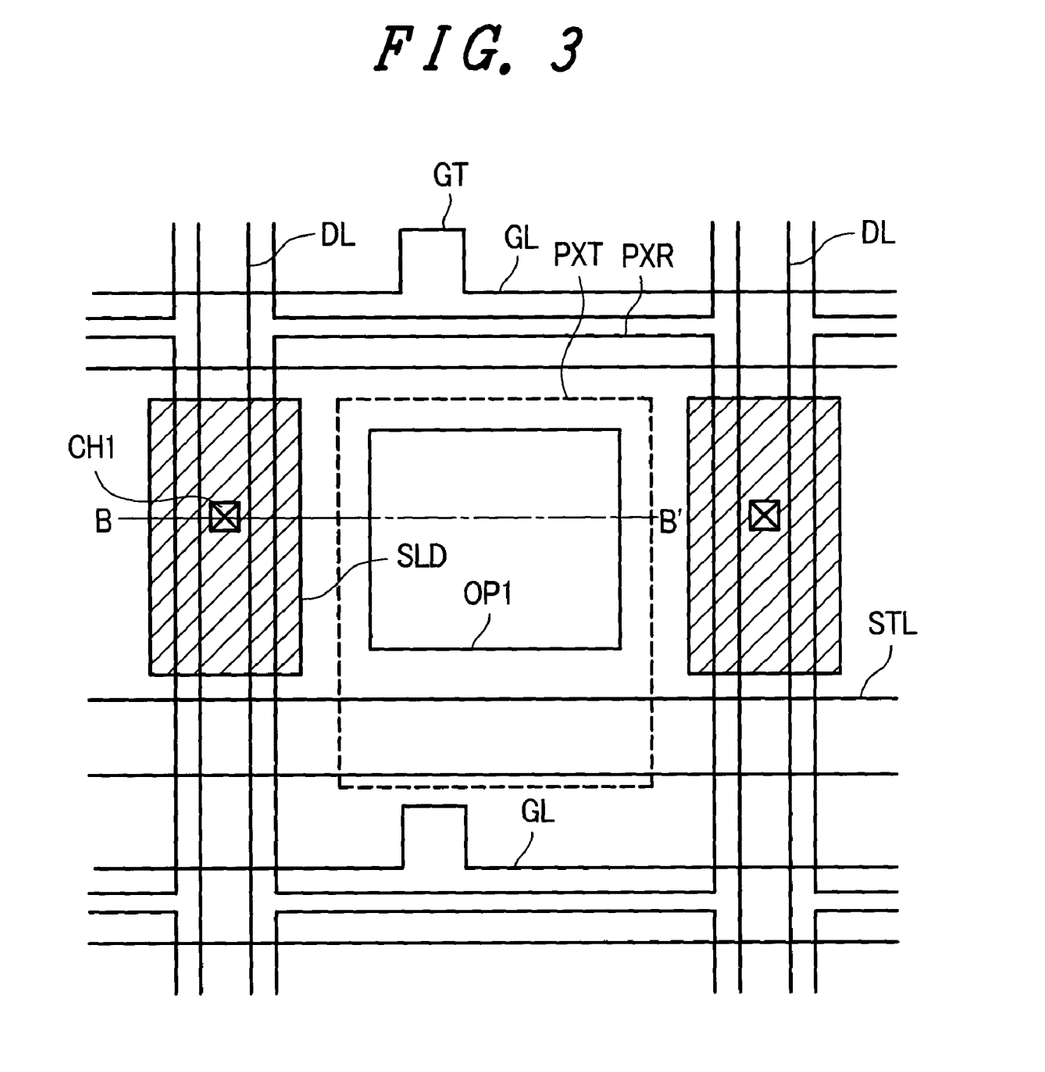
FIG. 3 is a diagrammatic plan view showing one example of the constitution of the pixel according to a second embodiment of the liquid crystal display device of the present invention.
Figure 4:
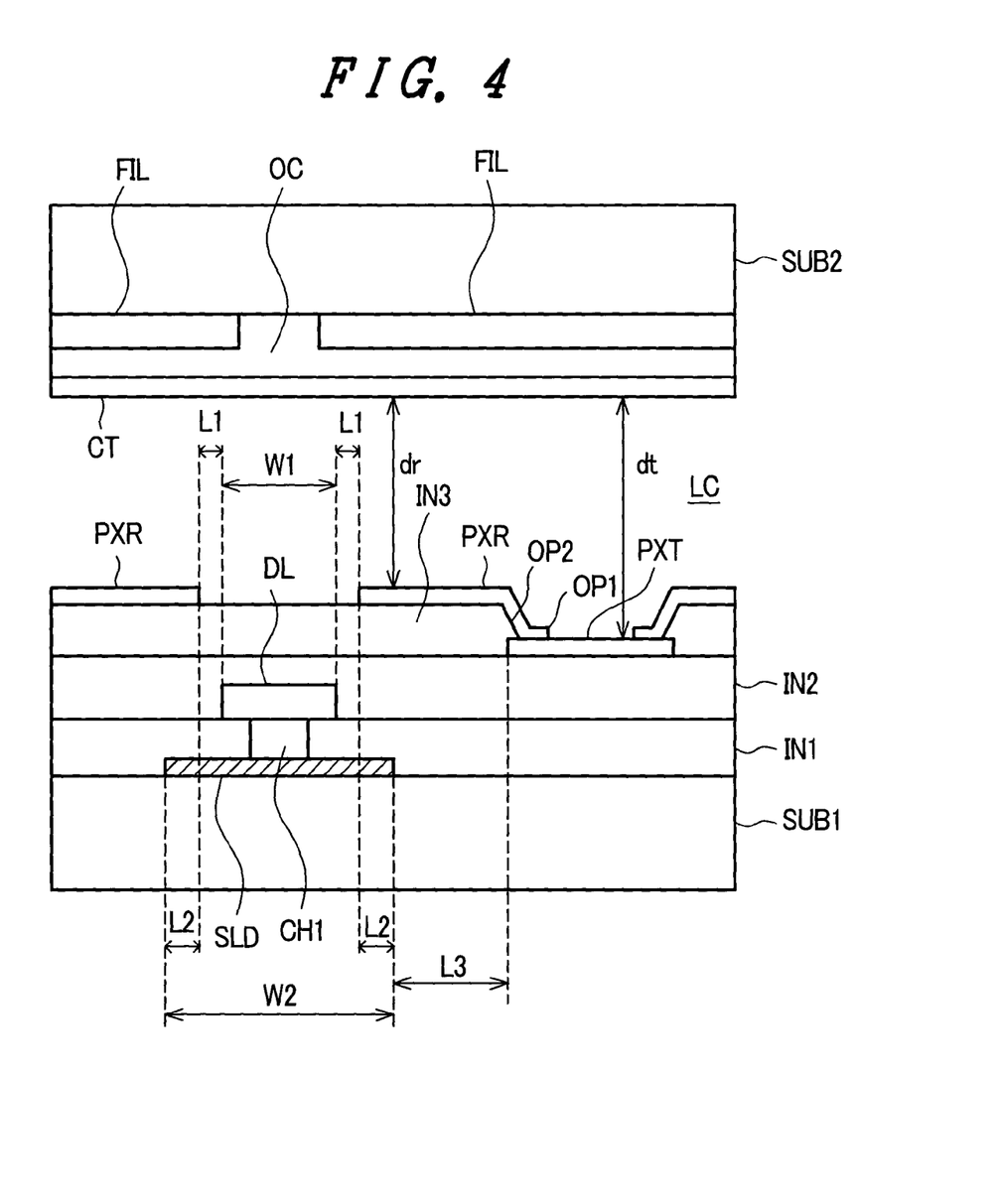
FIG. 4 is a cross-sectional view taken along a line B-B' in FIG. 3.

FIG. 3 is a diagram showing one example of the constitution of a pixel according to a second embodiment of the liquid crystal display device of the present invention. FIG. 4 is a cross-sectional view taken along a line B-B' in FIG. 3. In this embodiment, parts which are common with the parts of the first embodiment are indicated by the same symbols, and a repeated explanation thereof is omitted.

This embodiment is substantially equal to the first embodiment. The point which makes the second embodiment different from the first embodiment lies in the fact that a partially transmissive pixel structure is adopted. Each pixel includes a light reflective region and a light transmissive region (light transmitting region) in a pixel region. A reflective electrode PXR is formed as the pixel electrode in the light reflective region, and it produces a display by reflecting light incident from the counter substrate SUB2 side. On the other hand, in the light transmissive region, a transparent electrode PXT is formed as a second pixel electrode to which the video signals are supplied. The light transmissive region is formed such that, for example, an opening OP1 is formed in the light reflective electrode PXR so as to optically expose the transparent electrode PXT. Thus, a display is produced by allowing light from the backlight BL, which is incident from the substrate SUB1 side, to pass therethrough.

In FIG. 4, one example of this structure is shown. The structure is constituted as follows. After forming the second insulation film IN2, the transparent electrode PXT is formed. Then, a third insulation film IN3 is formed, and the light reflective electrode PXR is formed over the third insulation film IN3. In the light transmissive region, by forming an opening OP2 in the third insulation film IN3, a stepped portion is formed between the light transmissive region and the light reflective region, so that the thickness dt of the liquid crystal layer LC in the light transmissive region is greater than the thickness dr of the liquid crystal layer LC in the light reflective region. This feature is provided to approximate the respective optical characteristics of the light transmissive region and the light reflective region to each other by adjusting the optical path lengths of the light transmissive region and the light reflective region.

In this embodiment, the transparent electrode PXT, which constitutes the second pixel electrode, and the light shielding film SLD are positioned such that they do not overlap each other, as indicated by the spacing L3 in FIG. 4. Due to such an arrangement, it is possible to reduce the parasitic capacitance.

In this embodiment, the light reflective electrode PXR constitutes a portion which corresponds to the pixel electrode PX in the first embodiment. However, the invention is not limited to such a structure, and it is needless to say that the structure can be suitably modified such that the transparent electrode PXT may be used as a portion which corresponds to the pixel electrode PX in the first embodiment.

In FIG. 4, one example of the structure of the counter substrate SUB2 is also illustrated. Over the counter substrate SUB2, color filters FIL, a leveling film OC and a counter electrode CT are formed. A common potential Vcom is supplied to the counter electrode CT. This structure is also adopted by the other embodiments, including the first embodiment. Although orientation films and polarizers are also provided, they have been omitted from the drawing. These structures merely constitute one example and can be suitably modified when necessary.

Third Embodiment

Figure 5:
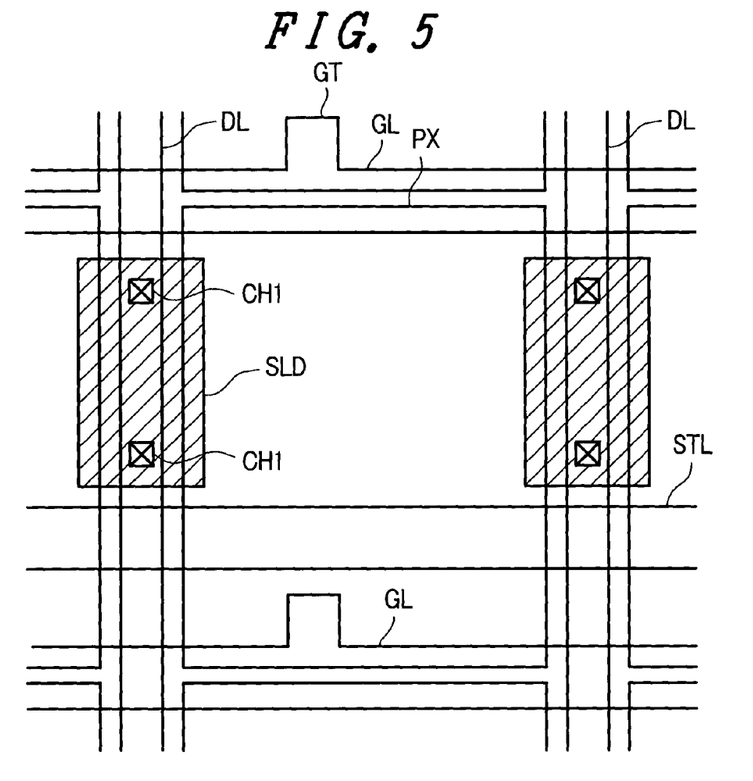
FIG. 5 is a diagrammatic plan view showing one example of the constitution of the pixel according to a third embodiment of the liquid crystal display device of the present invention.

FIG. 5 is a diagram showing one example of the constitution of a pixel according to a third embodiment of the liquid crystal display device of the present invention. In this embodiment, parts which are common with the parts of the other embodiments which have been explained heretofore are indicated by the same symbols, and a repeated explanation thereof is omitted.

Although the basic constitution of this embodiment is equal to that of the first embodiment, this embodiment differs from the first embodiment in that the video signal line DL and each conductive layer (light shielding film SLD) are connected to each other at two portions using two contact holes CH1. Accordingly, the video signal line DL and the light shielding film SLD are connected in parallel, and, hence, this gives rise to an advantageous effect in that the resistance can be reduced. Further, even when a disconnection occurs at a portion, since a bypass is formed, it is possible to produce a display. To obtain these advantageous effects, it is preferable to set the connection portions at positions in the vicinity of the end portion of the light shielding film SLD which are spaced from each other, as shown in FIG. 5.

The number of connection portions is not limited two, and there may be three or more. Further, the structure of this embodiment is also applicable to the second embodiment.

[Principle of Generation of Vertical Smear and Reduction of Vertical Smear]

Figure 6:
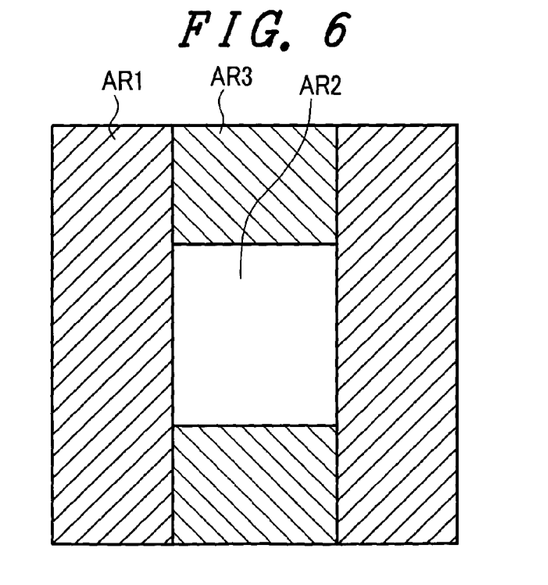
FIG. 6 is a diagram showing one example of a display screen in which vertical smear is generated.
Figure 7:
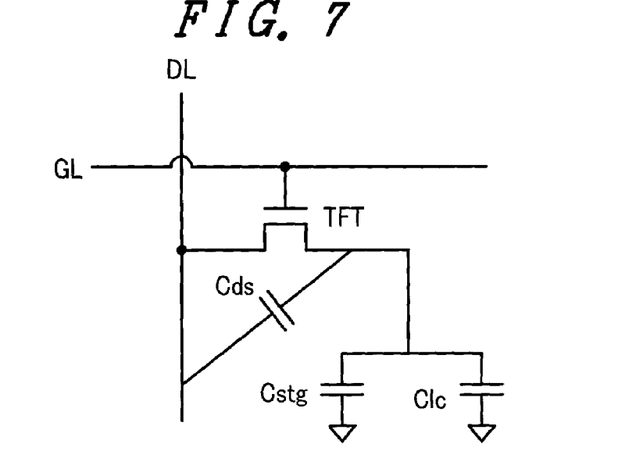
FIG. 7 is an equivalent circuit diagram of a pixel.
Figure 8:
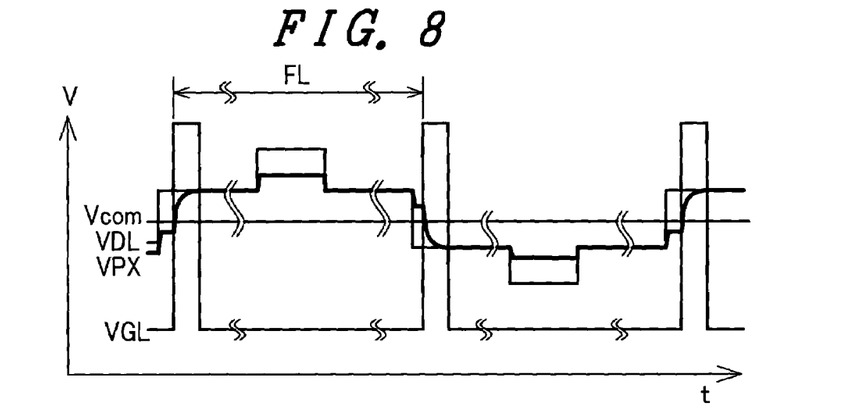
FIG. 8 is a waveform diagram showing signal waveforms in a region where vertical smear is generated.
Figure 9:
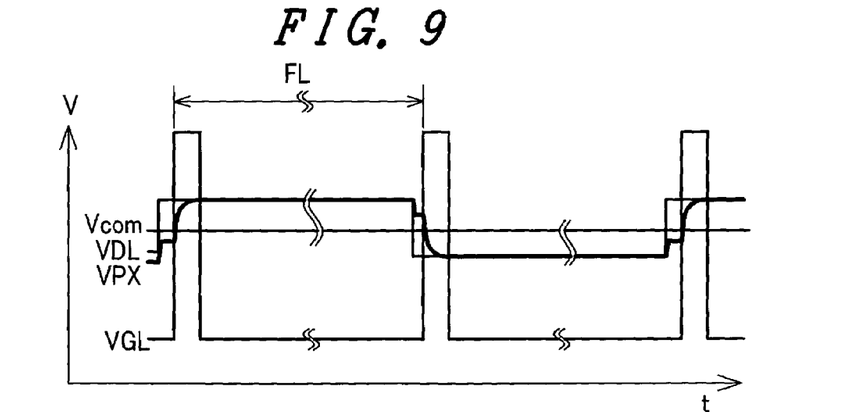
FIG. 9 is a waveform diagram showing signal waveforms in a region where vertical smear is not generated.

FIG. 6 is a diagram showing one example of a display screen in which the vertical smear is generated. FIG. 7 is a diagram showing the equivalent circuit of a pixel. FIG. 8 is a waveform diagram showing the signal waveform in a region where vertical smear is generated. FIG. 9 is a waveform diagram showing the signal waveform in a region where vertical smear is not generated.

FIG. 6 shows an example in which display regions AR1, AR3 are set to assume a half tone display of the same level as the background, and a rectangular white display window is provided in a display region AR2. Originally, the display regions AR1, AR3 are expected to have the same half tone level. However, in the display regions AR3, which are arranged above and below the display region AR2 (in the vertical direction), the tone is shifted to the white display level from the original half tone level. This phenomenon is referred to as a vertical smear.

As shown in FIG. 7, in the equivalent circuit of a pixel, the video signals are written in the pixel electrode PX (not shown in the drawing) from the video signal line DL through the thin film transistor TFT, which constitutes a switching element driven by the scanning signals supplied from the scanning signal line GL. The pixel electrode PX forms a liquid crystal capacitance Clc between the pixel electrode PX and the counter electrode CT, which are separated by a liquid crystal layer LC. Further, a storage capacitance Cstg is connected between the pixel electrode PX and the storage line STL, so that the voltage of the written video signal can be held for a relatively long time. Further, a parasitic capacitance Cds is generated between the pixel electrode PX and the video signal line DL.

In FIG. 8, time t is taken on an axis of abscissas and a potential V is taken on an axis of ordinates. In the waveform chart shown in FIG. 8, an alternating potential is produced by reversing the polarities with respect to the common potential Vcom of the video signal for every 1 frame period FL. To focus on a specific pixel in the display region AR3 in which a vertical smear is generated, with respect to the scanning signal line potential VGL of the row, the selection level of the scanning signal is applied for every frame period FL. A fixed common potential Vcom is applied to the counter electrode CT. At the beginning, the video signal line potential VDL assumes a certain half-tone potential as the video signal. Then, when the thin film transistor TFT assumes the ON state in synchronism with receipt of the scanning signal, a pixel electrode potential VPX of the specified pixel follows the video signal line potential VDL. When the supply of the scanning signals is finished and the thin film transistor TFT is turned OFF, the pixel electrode PX tries to hold the potential.

However, when the scanning sequentially advances and the scanning of the display region AR2 is about to be performed, the video signal line potential VDL is changed to the potential of the white display level. Here, due to the presence of the parasitic capacitance Cds, the pixel electrode potential VPX of the previously-mentioned specified pixel is also changed correspondingly. This brings about the vertical smear phenomenon. On the other hand, as shown in FIG. 9, when the video signal line potential is not changed during 1 frame period FL in the display region AR1, the pixel electrode potential VPX also is not changed.

Here, the voltage change level ΔV attributed to vertical smear can be expressed by the following formula, provided that the difference between the pixel electrode potential VPX and the video signal line potential VDL is set as Vt.

$$\Delta V = Cds/(Cstg+Clc+Cds) \times Vt$$

Accordingly, to decrease the voltage change level ΔV, it is possible to either decrease the parasitic capacitance Cds or increase the value (storage capacitance Cstg+liquid crystal capacitance Clc).

When the pixel definition of the liquid crystal panel is increased, the pixel size becomes more miniaturized, and, hence, inside of the pixel, the area for forming the storage capacitance Cstg and the area for forming the liquid crystal capacitance Clc are restricted. Accordingly, in such a case, it is advantageous to apply the present invention, which can reduce the parasitic capacitance Cds.

When polycrystalline silicon is used as the material for a semiconductor layer of the thin film transistor TFT which constitutes the switching element, a high definition display can be realized. In such a case, it is preferable to apply the present invention, since it can reduce vertical smear. It is needless to say that the present invention is not limited to such a case, and the present invention is naturally applicable to a case in which amorphous silicon is used as the material of the semiconductor layer.

Fourth Embodiment

Figure 10:
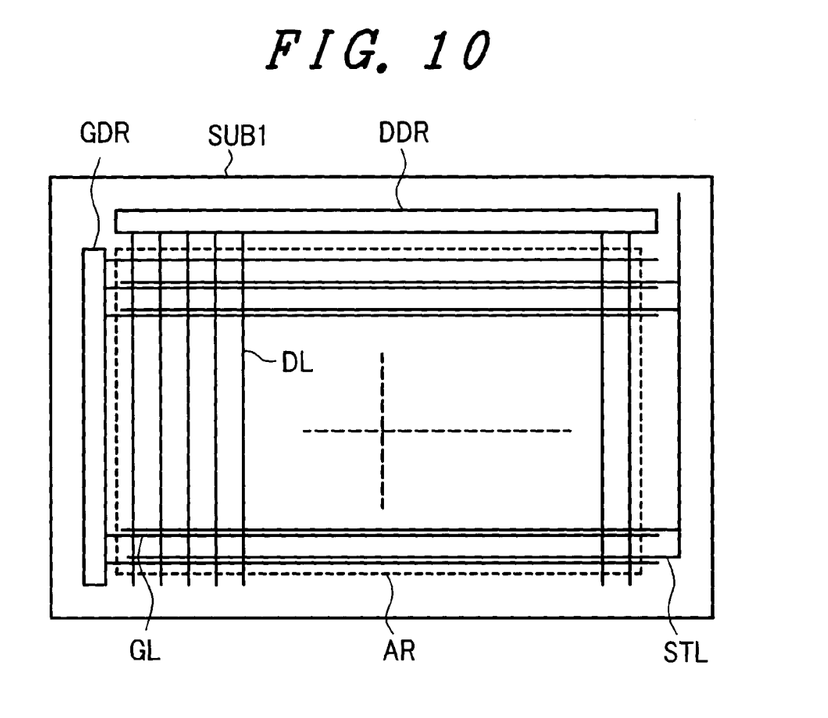
FIG. 10 is a diagrammatic plan view showing the overall constitution of the TFT substrate in a fourth embodiment of the liquid crystal display device of the present invention.

FIG. 10 is a schematic diagram showing the overall constitution of the TFT substrate in a fourth embodiment of the liquid crystal display device of the present invention.

On one substrate SUB1 of a pair of substrates having a liquid crystal layer LC sandwiched therebetween, a plurality of scanning signal lines GL, a plurality of video signal lines DL which cross the plurality of scanning signal lines GL, and a plurality of pixels (not shown in the drawing) which are arranged in a matrix array in the display region AR are formed. Storage lines STL for generating the storage capacitance Cstg are also formed on the substrate SUB1 and a common potential Vcom is applied to the storage lines STL.

A scanning signal driving circuit GDR, which supplies scanning signals, is connected to the scanning signal lines GL and sequentially performs scanning of the pixels. A video signal driving circuit DDR, which supplies video signals, is connected to the video signal lines DL.

Either one or both of the scanning signal driving circuit GDR and the video signal driving circuit DDR can be directly formed on the substrate SUB1 in parallel with the step of forming the thin film transistors TFT in the pixels, using thin film transistors made of polycrystalline silicon, so as to assemble a peripheral circuit incorporated type liquid crystal display device. However, the present invention is not limited to such a liquid crystal display device. That is, these driving circuits may be supplied in the form of semiconductor integrated circuit chips and may be directly mounted on the substrate SUB1, or they may be connected to the substrate SUB1 using a flexible printed circuit board (FPC) or a tape carrier package (TCP).

Fifth Embodiment

Figure 11:
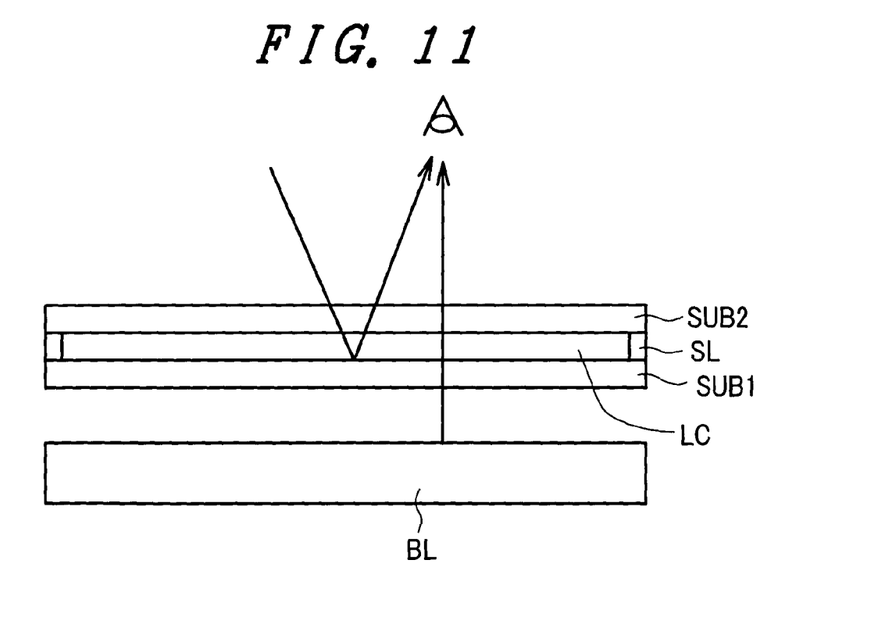
FIG. 11 is a diagram showing the overall constitution in a fifth embodiment of the liquid crystal display device of the present invention.

FIG. 11 is a diagram showing the overall constitution of a fifth embodiment of the liquid crystal display device of the present invention.

In FIG. 11, a substrate SUB1 and a counter substrate SUB2 are laminated to each other using a sealing material SL, with a liquid crystal layer LC being sandwiched therebetween, to form a liquid crystal display panel. Further, a backlight BL is arranged at a side of the substrate SUB1 opposite to the liquid crystal layer LC, and this backlight illuminates the liquid crystal display panel from the back side (side opposite to a viewer).

This embodiment illustrates a case which adopts a partial transmissive type liquid crystal display device, so that it is also possible to produce a display by reflecting light incident from the counter substrate SUB2 side. The present invention is not limited to such a liquid crystal display device. That is, the invention may be applied to a transmissive type liquid crystal display device as well.

Sixth Embodiment

Figure 12:
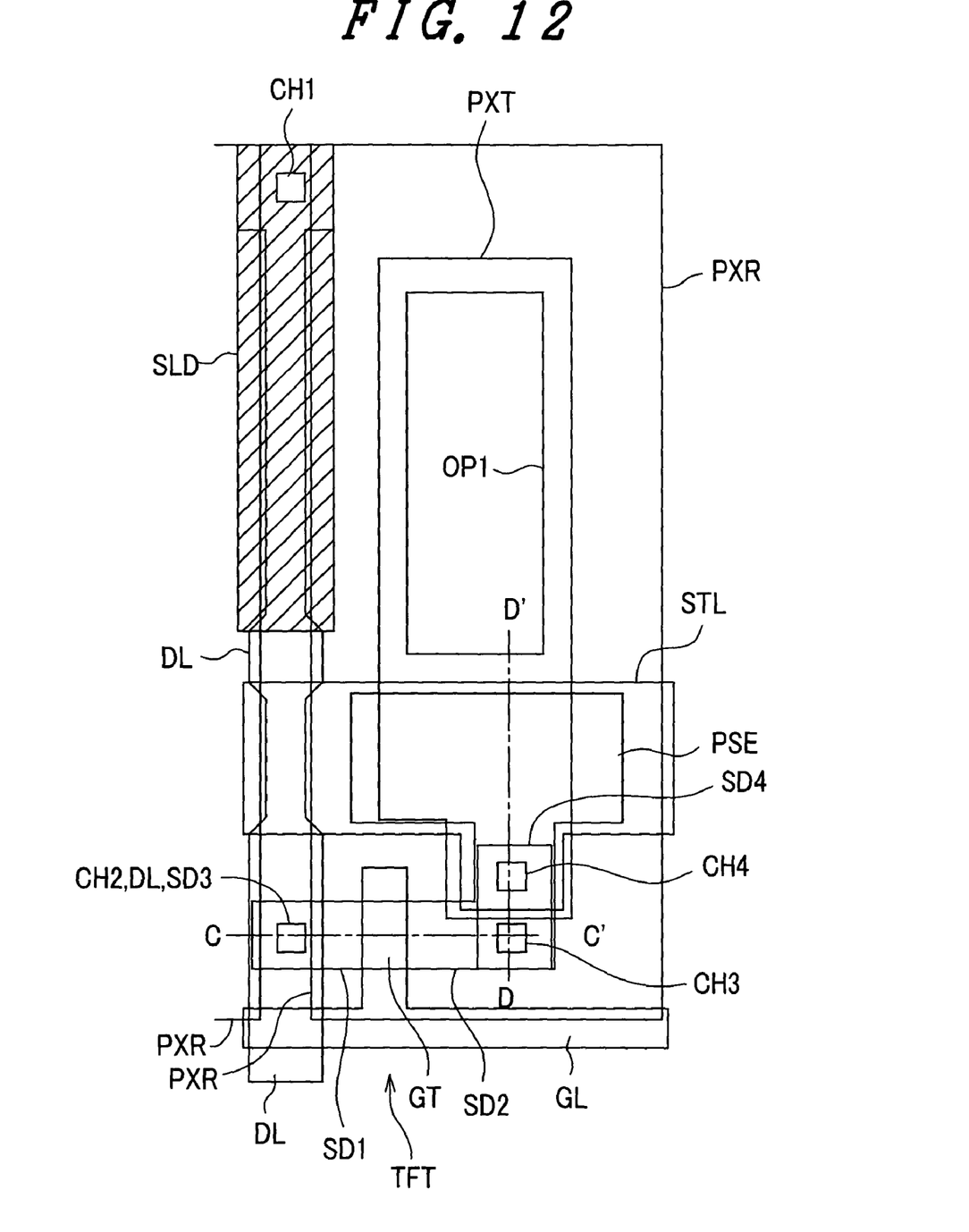
FIG. 12 is a diagrammatic plan view showing one example of the constitution of a pixel according to a sixth embodiment of the liquid crystal display device of the present invention.
Figure 13:
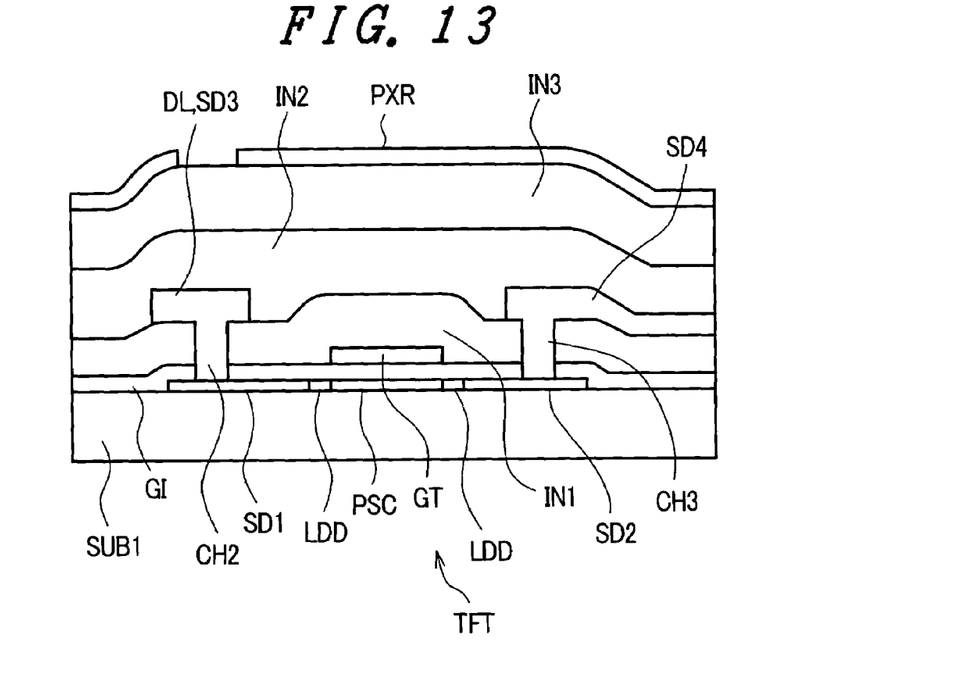
FIG. 13 is a cross-sectional view taken along a line C'-C in FIG. 12.
Figure 14:
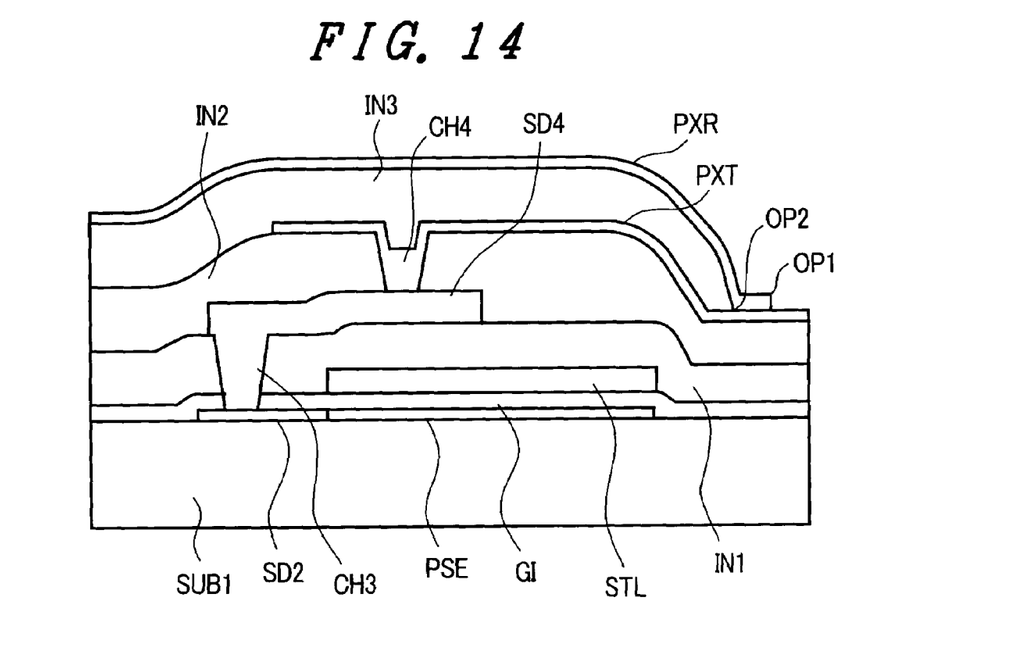
FIG. 14 is a cross-sectional view taken along a line D'-D in FIG. 12.

FIG. 12 is a diagram showing one example of the constitution of a pixel in a sixth embodiment of the liquid crystal display device of the present invention. FIG. 13 is a cross-sectional view taken along a line C-C' in FIG. 12. FIG. 14 is a cross-sectional view taken along a line D-D' in FIG. 12. In this embodiment, parts which are common with the parts of the other embodiments which have been explained heretofore are indicated by the same symbols, and a repeated explanation thereof will be omitted.

The constitution shown in FIG. 12 differs from the constitutions of other embodiments in that the width of the video signal line DL is not fixed. Particularly, at a portion of a contact hole CH1, through which an electrical connection between the video signal line DL and a light shielding film SLD is established, the video signal line DL has a larger width than a width in other portions thereof. This provision is made to ensure a sufficient connection area and to make the connection surely by taking the possibility of misalignment or the like into consideration.

In this case, since the parasitic capacitance Cds between the video signal line DL and the pixel electrode PX (in this embodiment, reflective electrode PXR) is increased, it is preferable to set the number of connection portions to as small a number as possible. Accordingly, this embodiment adopts a structure which connects the video signal line DL and a light shielding film SLD only at one portion.

From the viewpoint of reducing the parasitic capacitance Cds, it is preferable that the area of the portion where the light shielding film SLD and the pixel electrode PX (reflective electrode PXR) overlap each other is set to be larger than the area of the portion where the video signal line DL and the pixel electrode PX (reflective electrode PXR) overlap each other.

Further, at portions where the light shielding film SLD is not formed, the width of the video signal line DL is increased and overlaps with the pixel electrode (reflective electrode PXR), thus performing the function of light shielding.

Next, one example of the structure of the thin film transistor TFT, which constitutes one example of the switching element used in a pixel, will be explained. This explanation is made in conjunction with a case in which polycrystalline silicon is used as the material of a semiconductor layer of the thin film transistor TFT.

Over a semiconductor layer, a gate electrode GT is formed by way of a gate insulation film Gl. A semiconductor layer below the gate electrode GT constitutes a channel region PSC. Further, a drain region SD1 and a source region SD2 are formed by doping impurities into the semiconductor layer. In the vicinity of an end portion of the gate electrode GT, an LDD (Lightly Doped Drain) region LDD, which is doped with impurities having a concentration that is lower than the concentration of the impurities doped in the drain region SD1, and the source region SD2 is formed. In place of such a structure, it is also possible to form an offset region which exhibits the same state as the channel region PSC. A first insulation film IN1 is formed such that the first insulation film IN1 covers them. To the drain region SD1, a drain electrode SD3, which is formed integrally with the video signal line DL through the contact hole CH2 is connected. On the other hand, to the source region SD2, a source electrode SD4 is connected by way of the contact hole CH3. A second insulation film IN2 is formed such that the second insulation film IN2 covers them. Over the second insulation film IN2, a transparent electrode PXT is formed, and the transparent electrode PXT is connected to the source electrode SD4 by way of the contact hole CH4. A third insulation film IN3 is formed above such elements. Above the third insulation film IN3, a reflective electrode PXR is formed. Here, the reflective electrode PXR is connected with the transparent electrode PXT in an opening OP2 that is formed in the third insulation film IN3. However, the thin film transistor is not limited to such a constitution. That is, another contact hole may be formed, and the reflective electrode PXR may be connected to the transparent electrode PXT or the source electrode SD4 using such a contact hole.

In FIG. 14, the storage line STL generates the storage capacitances Cstg between the storage line STL and the capacitance electrode PSE, between the storage line STL and the source electrode SD4, and between the storage line STL and the transparent electrode PXT. Here, the capacitive electrode PSE is a semiconductor layer which becomes conductive by being doped with impurities and is integrally formed with the source region SD2. As the structure of the storage capacitance Cstg, various structures can be used besides the structure of this embodiment, and, also, they can be modified suitably.

The constitutional features of any one of the above-mentioned first to sixth embodiments can be combined with the constitutional features of one or more embodiments unless the combination induces a contradiction.

As has been explained heretofore, according to the present invention, it is possible to obtain a display device with improved image qualities.

What is claimed is:

1. A liquid crystal display device comprising a plurality of scanning signal lines, a plurality of video signal lines which cross the plurality of scanning signal lines, and a plurality of pixels which are arranged in a matrix array on one of a pair of substrates which sandwich a liquid crystal layer therebetween, wherein:

each pixel in the plurality of pixels includes a switching element driven by the scanning signal line and a pixel electrode to which video signals are supplied from the video signal line through the switching element;

one substrate includes opaque conductive layers at positions where portions thereof overlap the video signal lines and are separated therefrom by way of an insulation film, such that the opaque conductive layers are arranged closer to one substrate side than the video signal lines; and each opaque conductive layer has a portion which has a width greater than the width of the video signal line, each opaque conductive layer is partially overlapped with respect to both of adjacent pixel electrodes of two neighboring pixels with the video signal line being arranged therebetween, and each opaque conductive layer is electrically connected to a video signal line;

wherein each opaque conductive layer is electrically connected to the video signal line at one point by way of a contact hole formed in the insulation film.

2. A liquid crystal display device according to claim 1, wherein the video signal line and the opaque conductive layer are electrically connected to each other via a contact hole formed in the insulation film, and the video signal line has a width which is larger than a width of the corresponding contact hole thereof.

3. A liquid crystal display device according to claim 1, wherein the video signal line has at least a portion which has a width equal to or smaller than a gap between adjacent pixel electrodes of two neighboring pixels, with the video signal line being arranged therebetween.

4. A liquid crystal display device according to claim 1, wherein the area of a portion where the opaque conductive layer and the pixel electrode overlap each other is larger than the area of a portion where the video signal line and the pixel electrode overlap.

5. A liquid crystal display device according to claim 1, wherein the opaque conductive layer is formed of the same material as the scanning signal line.

6. A liquid crystal display device according to claim 1, wherein the liquid crystal display device includes a plurality of capacitance lines for forming storage capacitances in the respective pixels and the opaque conductive layers are formed of the same material as the capacitance lines.

7. A liquid crystal display device according to claim 1, wherein the opaque conductive layers are formed in independent patterns corresponding to a gap between two neighboring pixels.

8. A liquid crystal display device according to claim 1, wherein the pixel electrode is a transparent electrode.

9. A liquid crystal display device according to claim 1, wherein the pixel electrode is a reflective electrode.

10. A liquid crystal display device according to claim 1, wherein the pixel electrode is a reflective electrode and each pixel includes a second pixel electrode which is formed as a transparent electrode and to which the video signals are applied.

11. A liquid crystal display device according to claim 10, wherein the opaque conductive layer is formed at a position where the opaque conductive layer does not overlap the second pixel electrode.

12. A liquid crystal display device according to claim 10, wherein a step portion is formed between the transparent electrode in a light transmitting region and the reflective electrode in a light reflective region, and the thickness of the liquid crystal layer in the light transmitting region is greater than the thickness of the liquid crystal layer in the light reflective region.

13. A liquid crystal display device according to claim 1, wherein the distance from the opaque conductive layer to the pixel electrode as measured in the vertical direction with respect to the substrate is greater than the distance from the video signal line to the pixel electrode as measured in the vertical direction with respect to the substrate.

14. A liquid crystal display device according to claim 1, wherein the liquid crystal display device includes a backlight.

15. A liquid crystal display device according to claim 1, wherein the video signal line and the opaque conductive layer are electrically connected to each other via the contact hole formed in the insulation film, the video signal line has a first portion which has a first width and a second portion which has a second width larger than the first width, and the contact hole is overlapped with the second portion of the video signal line.

* * * * *